United States Patent
Wing (10) Patent No.: US 12,024,472 B2
(45) Date of Patent: Jul. 2, 2024

(54) METHODS OF EXTRACTING VOLATILES FROM CERAMIC GREEN BODIES

(71) Applicant: CORNING INCORPORATED, Corning, NY (US)

(72) Inventor: Douglas Richard Wing, Corning, NY (US)

(73) Assignee: Corning Incorporated, Corning, NY (US)

(*) Notice: Subject to any disclaimer, the term of this patent is extended or adjusted under 35 U.S.C. 154(b) by 0 days.

(21) Appl. No.: 18/135,348

(22) Filed: Apr. 17, 2023

(65) Prior Publication Data

US 2023/0250027 A1 Aug. 10, 2023

Related U.S. Application Data

(63) Continuation of application No. 16/628,373, filed as application No. PCT/US2018/042819 on Jul. 19, 2018, now Pat. No. 11,661,379.

(60) Provisional application No. 62/535,549, filed on Jul. 21, 2017.

(51) Int. Cl.
  *C04B 35/638* (2006.01)
  *C04B 35/636* (2006.01)

(52) U.S. Cl.
  CPC ........ *C04B 35/638* (2013.01); *C04B 35/6365* (2013.01); *C04B 2235/6562* (2013.01); *C04B 2235/6567* (2013.01); *C04B 2235/6584* (2013.01)

(58) Field of Classification Search
  CPC .................. C04B 35/638; C04B 2235/6584
  See application file for complete search history.

(56) References Cited

U.S. PATENT DOCUMENTS

| 4,051,231 A | 9/1977 | Bond et al. |
| 4,404,166 A | 9/1983 | Wiech, Jr. |
| 4,483,944 A | 11/1984 | Day et al. |
| 4,855,265 A | 8/1989 | Day et al. |
| 4,927,577 A | 5/1990 | Ohtaka et al. |

(Continued)

FOREIGN PATENT DOCUMENTS

| EP | 2484654 A1 | 8/2012 |
| JP | 2002-020173 A | 1/2002 |

(Continued)

OTHER PUBLICATIONS

Shukla et al., "Binder Evolution From Powder Compacts: Thermal Profile for Injection-Molded Articles," Journal of the American Ceramic Society; V. 72, N. 10.; p. 1797-1803, (1989).

*Primary Examiner* — Erin Snelting
(74) *Attorney, Agent, or Firm* — Daniel J. Greenhalgh (57) ABSTRACT

Methods of producing a ceramic article include heating the ceramic green body containing a quantity of one or more organic materials to extract only a fraction of the organic materials from the ceramic green body by exposing the ceramic green body to a process atmosphere which is heated to a hold temperature of from 225° C. to about 400° C. and has from 2% to 7% $O_2$ by volume of the process atmosphere. The method further includes cooling the ceramic green body to a temperature of below 200° C., exposing the ceramic green body to a higher concentration of $O_2$ than in the process atmosphere of the heating step, and firing the ceramic green body to form the ceramic article. Volatile extraction units for implementing the methods are also described.

20 Claims, 4 Drawing Sheets

(56) References Cited

U.S. PATENT DOCUMENTS

| | | |
|---|---|---|
| 5,183,609 A | 2/1993 | Miyahara |
| 5,290,739 A | 3/1994 | Hickman |
| 6,099,793 A | 8/2000 | Dull et al. |
| 6,287,509 B1 | 9/2001 | Gheorghiu |
| 6,325,963 B1 | 12/2001 | Dull et al. |
| 6,537,481 B2 | 3/2003 | Brennan |
| 6,555,031 B2 | 4/2003 | Gadkaree et al. |
| 6,555,036 B1 | 4/2003 | Brennan et al. |
| 6,620,751 B1 | 9/2003 | Ogunwumi |
| 6,699,429 B2 | 3/2004 | Lu et al. |
| 6,849,181 B2 | 2/2005 | Ogunwumi et al. |
| 6,942,713 B2 | 9/2005 | Ogunwumi et al. |
| 7,001,861 B2 | 2/2006 | Beall et al. |
| 7,294,164 B2 | 11/2007 | Merkel |
| 9,272,957 B2 | 3/2016 | Suzuki et al. |
| 2002/0003322 A1 | 1/2002 | Dull et al. |
| 2007/0006561 A1 | 1/2007 | Brady et al. |
| 2007/0054229 A1 | 3/2007 | Hanzawa et al. |
| 2008/0116621 A1 | 5/2008 | Brennan et al. |
| 2009/0193636 A1 | 8/2009 | Florian et al. |
| 2010/0247406 A1 | 9/2010 | Ohno et al. |
| 2011/0127699 A1 | 6/2011 | Vayansky et al. |
| 2013/0241120 A1 | 9/2013 | Yamanishi et al. |
| 2014/0011150 A1 | 1/2014 | Miyata et al. |
| 2014/0011151 A1 | 1/2014 | Miyata et al. |
| 2014/0138882 A1 | 5/2014 | Castilone et al. |
| 2014/0252695 A1 | 9/2014 | Beall et al. |
| 2014/0327191 A1 | 11/2014 | Suzuki et al. |
| 2015/0050609 A1 | 2/2015 | Beall et al. |
| 2015/0183692 A1 | 7/2015 | Malanga et al. |

FOREIGN PATENT DOCUMENTS

| | | |
|---|---|---|
| JP | 4828934 B2 | 11/2011 |
| WO | 2015/023554 A1 | 2/2015 |

METHODS OF EXTRACTING VOLATILES FROM CERAMIC GREEN BODIES

CROSS REFERENCE TO RELATED APPLICATION

This application is a continuation of U.S. application Ser. No. 16/628,373, filed on Jan. 3, 2020, which is a National Stage application under 35 U.S.C. § 371 of International Application No. PCT/US2018/042819 filed on Jul. 19, 2018, which claims the benefit of priority under 35 U.S.C. § 119 of U.S. Provisional Application Ser. No. 62/535,549, filed on Jul. 21, 2017, the contents of which are relied upon and incorporated herein by reference in their entireties.

BACKGROUND

Field

The present specification generally relates to the manufacture of ceramic articles and, more particularly, to methods for extracting volatiles from ceramic green bodies prior to firing.

Technical Background

Ceramic articles composed of refractory ceramic materials such as cordierite, silicon carbide, aluminum titanate and the like are widely used for the manufacture of catalytic substrates and particulate filters. Such substrates and filters are employed for the removal of pollutants such as carbon monoxide, nitrogen and sulfur oxides, unburned hydrocarbons and particulates such as soot from combustion engine exhaust gases or stack gases from industrial combustion processes.

SUMMARY

According to one aspect, a method of producing a ceramic article comprises heating a ceramic green body containing a quantity of one or more organic materials to extract only a fraction of the organic materials from the ceramic green body by heating the green body by exposing the ceramic green body to a process atmosphere which is heated to a hold temperature of from 225° C. to 400° C. and has from 2% to 7% $O_2$ by volume of the process atmosphere. The method further comprises cooling the ceramic green body to a temperature of below 200° C., exposing the ceramic green body to a higher concentration of $O_2$ than in the process atmosphere of the heating step, and firing the ceramic green body to form the ceramic article.

According to another aspect, a method of producing a ceramic article comprises placing a ceramic green body comprising organic materials in a volatile extraction unit, heating the ceramic green body by exposing the ceramic green body to a process atmosphere within the volatile extraction unit heated to a first temperature and having a concentration of $O_2$ of from 2% to 7% $O_2$ by volume of the process atmosphere to remove at least some of the organic materials from the ceramic green body, and heating the process atmosphere to a second temperature to remove at least an additional amount of the organic materials from the ceramic green body. The first temperature is from 140° C. to 180° C. and the second temperature is from 225° C. to 400° C. The method further comprises cooling the ceramic green body to a temperature of below 200° C., increasing an amount of $O_2$ in the process atmosphere, and firing the ceramic green body to form the ceramic article.

According to yet another aspect, a method of forming a ceramic article comprises providing a ceramic green body comprising organic materials, and heating the ceramic green body to extract at least a portion of the organic materials. The ceramic green body is heated by exposing the ceramic green body to a process atmosphere heated at a rate of from 50° C./h to 130° C./h to a temperature of from 225° C. to 400° C. and having from 2% to 7% $O_2$ by volume of the process atmosphere. The method further comprises cooling the ceramic green body to a temperature below 200° C., increasing an amount of $O_2$ in the process atmosphere, and firing the ceramic green body to form the ceramic article.

Additional features and advantages will be set forth in the detailed description which follows, and in part will be readily apparent to those skilled in the art from that description or recognized by practicing the embodiments described herein, including the detailed description which follows, the claims, as well as the appended drawings.

It is to be understood that both the foregoing general description and the following detailed description describe various embodiments of methods and apparatuses for forming ceramic articles and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

DETAILED DESCRIPTION

Reference will now be made in detail to various embodiments of methods for producing ceramic articles comprising extracting at least some organic materials prior to firing, examples of which are illustrated in the accompanying drawings. Whenever possible, the same reference numerals will be used throughout the drawings to refer to the same or like parts.

Figure 1:
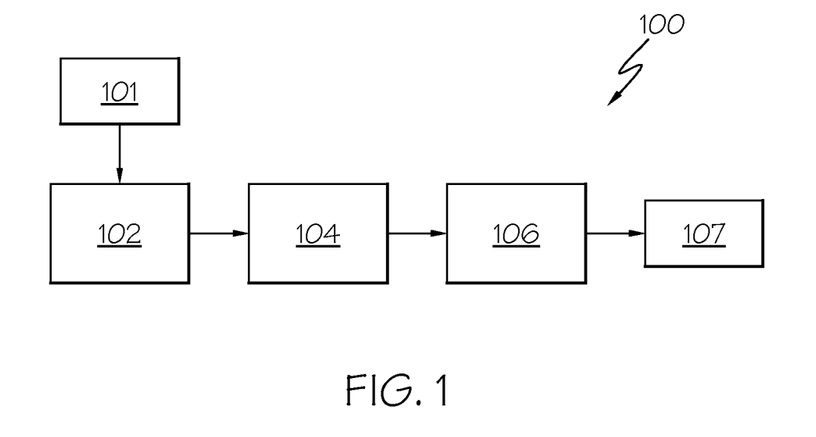
FIG. 1 is a flow diagram of an example ceramic article production line for forming a ceramic article in accordance with one or more embodiments described herein.

One embodiment of a ceramic article production line is schematically depicted in FIG. 1, and is designated generally throughout by the reference numeral 100. The ceramic article production line 100 may generally comprise an extruder 102 for forming a ceramic green body from ceramic batch materials, a volatile extraction unit 104 for extracting at least some organic material, or volatiles, from the ceramic green body, and a kiln 106 for firing the ceramic green body to form a ceramic article. The volatile extraction unit 104 may comprise a process atmosphere having a low oxygen concentration and, by heating the ceramic green body, extracts at least some of the organic materials from the ceramic green body. Accordingly, because high volatile concentrations, or portions of the organic materials, have already been released in the volatile extraction unit 104, the ceramic green body may be fired in the kiln 106 for a shorter period of time and without atmospheric controls, thermal oxidizers, and/or lower flammability limit (LFL) and limited oxygen concentration (LOC) controls.

Unless otherwise expressly stated, it is in no way intended that any method set forth herein be construed as requiring that its steps be performed in a specific order, nor that with any apparatus specific orientations be required. Accordingly, where a method claim does not actually recite an order to be followed by its steps, or that any apparatus claim does not actually recite an order or orientation to individual components, or it is not otherwise specifically stated in the claims or description that the steps are to be limited to a specific order, or that a specific order or orientation to components of an apparatus is not recited, it is in no way intended that an order or orientation be inferred, in any respect.

As used herein, the singular forms "a," "an" and "the" include plural referents unless the context clearly dictates otherwise. Thus, for example, reference to "a" component includes aspects having two or more such components, unless the context clearly indicates otherwise.

As used herein, the terms "unfired extruded body," "green body," "green ceramic body," or "ceramic green body" refer to an unsintered body, part, or ware before firing, unless otherwise specified. The terms "batch mixture," "ceramic precursor batch," "green composition," and "green batch material" refer to the mixture of materials that are used to form the green body by extrusion, unless otherwise specified. The unfired extruded body and batch mixture contain a vehicle, such as water, and typically comprise inorganic components, and can comprise other materials such as binders, pore formers, stabilizers, plasticizers, and the like.

As used herein, "firing" refers to thermal processing of the green body at an elevated temperature to form a ceramic material or a ceramic body.

As used herein, a "wt %," "weight percent," or "percent by weight" of an inorganic or organic component, unless specifically stated to the contrary, is based on the total weight of the inorganics in which the component is included. Organic components are specified herein as super additions based upon 100% of the inorganic components used.

Specific and preferred values disclosed for components, ingredients, additives, reactants, constants, scaling factors, and like aspects, and ranges thereof, are for illustration only. They do not exclude other defined values or other values within defined ranges. The compositions, apparatus, and methods of the disclosure include those having any value or combination of the values, specific values, or ranges thereof described herein. Any ranges of values set forth in this specification contemplate all values within the range and are to be construed as support for claims reciting any sub-ranges having endpoints which are real number values within the specified range in question. By way of a hypothetical illustrative example, a recitation in this disclosure of a range of from about 1 to about 5 shall be considered to support claims to any of the following ranges: 1-5; 1-4; 1-3; 1-2; 2-5; 2-4; 2-3; 3-5; 3-4; and 4-5.

During firing of ceramic bodies, organic materials (such as organic components or additives) vaporize into the kiln atmosphere. These vapors can be volatile and can comprise hydrogen and carbon monoxide, which are combustible and can become flammable leading to dangerous conditions during processing. The National Fire Protection Agency (NFPA) requires manufacturers of ceramic products with organic additive systems to maintain kiln atmospheres at specific levels of volatile organic compounds to prevent uncontrolled combustion, deflagration or detonation. Although atmospheric controls can be incorporated into firing kilns to meet NFPA requirements, firing cycles that last several hours or longer can result in large capital expenses on a per cycle basis. The methods disclosed herein may reduce the length of firing cycles as well as reduce or eliminate the need for atmospheric controls in firing cycles by extracting at least some organic materials from ceramic green bodies prior to firing.

Referring to FIG. 1, one embodiment of a ceramic article production line 100 for forming a ceramic article 107 is schematically depicted. The ceramic article production line 100 generally comprises an extruder 102 for forming a ceramic green body from a ceramic batch mixture 101, a volatile extraction unit 104 located downstream of the extruder 102 for extracting at least some organic material from the ceramic green body, and a kiln 106 for firing the ceramic green body after at least some organic material has been extracted in the volatile extraction unit 104 to form the ceramic article 107. Although various embodiments herein describe forming a ceramic green body using an extruder, it is contemplated that the ceramic green body may be formed by any suitable technique, including, by way of example and not limitation, molding, pressing, or casting.

The ceramic batch mixture 101 from which the ceramic green body is formed comprises ceramic-forming raw materials. The ceramic-forming raw materials are typically inorganic materials. As an example, the ceramic-forming raw materials may be cordierite-forming raw materials, aluminum titanate-forming raw materials, silicon carbide-forming raw materials, alumina-forming raw materials, alumina, silica, magnesia, titania, aluminum-containing ingredients, silicon-containing ingredients, titanium-containing ingredients, and the like.

Cordierite-forming raw materials may comprise, for example, at least one magnesium source, at least one alumina source, and at least one silica source. The cordierite-forming raw materials may further comprise one or more of clay and titania, as well as alkaline earth metals and oxides.

In the embodiments described herein, sources of magnesium comprise, but are not limited to, magnesium oxide or other materials having low water solubility that, when fired, convert to MgO, such as $Mg(OH)_2$, $MgCO_3$, and combinations thereof. For example, the source of magnesium may be talc ($Mg_3Si_4O_{10}(OH)_2$), comprising calcined and/or uncalcined talc, and coarse and/or fine talc.

Sources of alumina comprise, but are not limited to, powders that, when heated to a sufficiently high temperature in the absence of other raw materials, will yield substantially pure aluminum oxide. Examples of suitable alumina sources may comprise alpha-alumina, a transition alumina such as gamma-alumina or rho-alumina, hydrated alumina or aluminum trihydrate, gibbsite, corundum ($Al_2O_3$), boehmite (AlO(OH)), pseudoboehmite, aluminum hydroxide ($Al(OH)_3$), aluminum oxyhydroxide, and mixtures thereof.

Silica may be present in its pure chemical state, such as α-quartz or fused silica. Sources of silica may comprise, but are not limited to, non-crystalline silica, such as fused silica or sol-gel silica, silicone resin, low-alumina substantially alkali-free zeolite, diatomaceous silica, kaolin, and crystalline silica, such as quartz or cristobalite. Additionally, the sources of silica may further comprise, but are not limited to, silica-forming sources that comprise a compound that forms free silica when heated. For example, silicic acid or a silicon organometallic compound may form free silica when heated.

Hydrated clays used in cordierite-forming raw materials can comprise, by way of example and not limitation, kaolinite ($Al_2(Si_2O_5)(OH)_4$), halloysite ($Al_2(Si_2O_5)(OH)_4 \cdot H_2O$), pyrophyllite ($Al_2(Si_2O_5)(OH)_2$), combinations or mixtures thereof, and the like.

Aluminum titanate-forming raw materials may comprise, for example, an alumina source, a silica source, and a titania source. The titania source can in one aspect be a titanium dioxide composition, such as rutile titania, anatase titania, or a combination thereof. The alumina source and silica source may be selected from the sources of alumina and silica described hereinabove. Exemplary non-limiting inorganic batch component mixtures suitable for forming aluminum titanate include those disclosed in U.S. Pat. Nos. 4,483,944; 4,855,265; 5,290,739; 6,620,751; 6,942,713; 6,849,181; 7,001,861; and 7,294,164, each of which is hereby incorporated by reference.

Silicon carbide-forming raw materials may comprise, for example, finely powdered silicon metal, a carbon precursor, and powdered silicon-containing fillers. The carbon precursor may be, for example, a water soluble crosslinking thermoset resin having a viscosity of less than about 1000 centipoise (cp). The thermoset resin utilized may be a high carbon yield resin in an amount such that the resultant carbon to silicon ratio in the batch mixture is about 12:28 by weight, the stoichiometric ratio of Si—C needed for formation of silicon carbide. Suitable silicon-containing fillers comprise silicon carbide, silicon nitride, mullite or other refractory materials. Exemplary non-limiting inorganic batch component mixtures suitable for forming silicon carbide include those disclosed in U.S. Pat. Nos. 6,555,031 and 6,699,429, each of which is hereby incorporated by reference.

Aluminum oxide-forming raw materials may comprise $Al_2O_3$ and/or aluminum oxide-forming ingredients.

In addition to the ceramic-forming raw materials, the ceramic batch mixture 101 comprises organic materials that may comprise lubricants, surfactants, binders, and/or one or more pore-forming materials. The term "organic materials," as used herein, excludes the amount of solvents, such as water, included in various batch compositions. The organic materials are used to form a flowable dispersion that has a relatively high loading of the ceramic material. The lubricants and surfactants are chemically compatible with the inorganic components, and provide sufficient strength and stiffness to allow handling of the ceramic green body. In embodiments, the ceramic batch mixture 101 may have organic materials in percent by weight of the inorganic components, by super addition, from about 1% to about 25% or even from about 2% to about 20%. In some embodiments, the ceramic batch mixture 101 may have organic materials in percent by weight of the inorganic components, by super addition, from about 5% to about 15%, from about 7% to about 12%, or even from about 9% to about 10%. In some embodiments, the ceramic batch mixture 101 may have organic materials in percent by weight of the inorganic components, by super addition, from about 5% to about 11%, or about 7%.

The organic materials, in some embodiments, may comprise a binder and at least one pore-forming material. In embodiments, the organic binder is present in the composition as a super addition in an amount in the range of from 0.1% to about 10.0% by weight of the inorganic ceramic batch mixture. Binders may comprise, but are not limited to, cellulose-containing components such as methylcellulose, ethylhydroxy ethylcellulose, hydroxybutyl methylcellulose, hydroxymethylcellulose, hydroxypropyl methylcellulose, hydroxyethyl methylcellulose, hydroxybutylcellulose, hydroxyethylcellulose, hydroxypropylcellulose, sodium carboxy methylcellulose, and mixtures thereof. Methylcellulose and/or methylcellulose derivatives, such as hydroxypropyl methylcellulose, are especially suited as organic binders.

Pore formers are fugitive particulate material which is vaporized by combustion during drying and heating of the ceramic green body leaving behind a larger porosity than would otherwise be obtained. Pore-forming materials can comprise, for example, carbon (e.g., graphite, activated carbon, petroleum coke, and carbon black), starch (e.g., corn, barley, bean, potato, rice, tapioca, pea, sago palm, wheat, canna, and walnut shell flour), polymers (e.g., polybutylene, polymethylpentene, polyethylene, polypropylene, polystyrene, polyamides (nylons), epoxies, acrylonitrile butadiene styrene (ABS), acrylics, and polyesters (PET)), hydrogen peroxides, and/or resins, such as phenol resin. In embodiments comprising pore formers, one or more pore-forming materials may be employed. For example, in embodiments, a combination of a polymer and a starch may be used as the pore former. In the embodiments described herein, the ceramic batch mixture may comprise from about 10% to about 35% by weight of an organic pore former. In the embodiments described herein the organic pore formers generally have a median particle size $d_{50}$ less than or equal to 20 microns. In some embodiments, the organic pore formers have a median particle size $d_{50}$ less than or equal to 15 microns or even a median particle size $d_{50}$ less than or equal to 10 microns. It should be understood that the particular size and amount of pore former may be selected based on a desired porosity and pore sized distribution in the finished ceramic article.

The lubricant provides fluidity to the ceramic precursor batch and aids in shaping the ceramic precursor batch while also allowing the batch to remain sufficiently stiff during the forming (i.e., the extruding) process. The lubricant can comprise, for example, mineral oils distilled from petroleum, synthetic and semi-synthetic base oils, including Group II and Group III paraffinic base oils, polyalphaolefins, alphaolefins, and the like. In various embodiments, the lubricant is a polyalphaolefin. Exemplary polyalphaolefins suitable for use include those sold under the trade name DURASYN®, including but not limited to DURASYN® 162 and DURASYN® 164, and SILKFLO®, including but not limited to SILKFLO® 362, available from INEOS Group AG (Switzerland). Other exemplary lubricants suitable for use include those sold under the trade names NEXBASE®, including but not limited to NEXBASE® 3020 (Neste Oil, Finland), and PARAFLEX™, including but not limited to PARAFLEX™ HT5 (Petro-Canada, Canada). In various embodiments, the lubricant is present in an amount of at least 3 wt % of the inorganic components, by super addition.

Organic surfactants may adsorb to the inorganic particles, keep the inorganic particles in suspension, and prevent clumping of the inorganic particles. The organic surfactant can comprise, for example, $C_8$-$C_{22}$ fatty acids and/or their ester or alcohol derivatives, such as stearic, lauric, linoleic, oleic, myristic, palmitic, and palmitoleic acids, soy lecithin, and mixtures thereof. In various embodiments, the organic surfactant is present in an amount of at least 0.3 wt % of the inorganic components, by super addition.

In various embodiments, solvents may be added to the batch mixture to create a ceramic paste (precursor or otherwise) from which the ceramic green body is formed. In embodiments, the solvents may comprise aqueous-based solvents, such as water or water-miscible solvents. In some embodiments, the solvent is water. The amount of aqueous solvent present in the ceramic precursor batch may range from about 20 wt % to about 50 wt % of the total weight of the batch mixture.

According to various embodiments, the organic materials are added to at least one inorganic component and mixed to form the ceramic batch mixture 101. The ceramic batch mixture 101 may be made by conventional techniques. By way of example, the inorganic components may be combined as powdered materials and intimately mixed to form a substantially homogeneous batch. The organic materials and/or solvent may be mixed with inorganic components individually, in any order, or together to form a substantially homogeneous batch. Of course, other suitable steps and conditions for combining and/or mixing inorganic components and organic materials together to produce a substantially homogeneous batch may be used. For example, the inorganic components and organic materials may be mixed by a kneading process to form a substantially homogeneous batch mixture.

In various embodiments, the ceramic batch mixture 101 is shaped or formed into a structure using conventional forming means, such as molding, pressing, casting, extrusion, and the like. According to the embodiment depicted in FIG. 1, the ceramic batch mixture 101 is extruded using the extruder 102 to form a ceramic green body. The extruder 102 may be a hydraulic ram extrusion press, a two stage de-airing single auger extruder, or a twin screw mixer with a die assembly attached to the discharge end of the extruder 102, depending on the particular embodiment. The ceramic batch mixture 101 may be extruded at a predetermined temperature and velocity.

In various embodiments, the ceramic batch mixture 101 is formed into a honeycomb structure. The honeycomb structure may comprise a web structure having a plurality of cells separated by cell walls. However, it is contemplated that the ceramic green body may be in a form other than a honeycomb structure.

In various embodiments, after the ceramic green body is formed, at least some of the organic materials or volatiles are extracted in the volatile extraction unit 104. As will be described in greater detail, the volatile extraction unit 104 may be a kiln that comprises at least a temperature sensor for sensing a temperature within the volatile extraction unit 104, a temperature control unit communicatively coupled to the temperature sensor and configured to adjust the temperature within the volatile extraction unit 104, a gas injection port for injecting a low oxygen content gas into the volatile extraction unit 104, and an exhaust system for releasing the volatiles from the volatile extraction unit 104. In various embodiments, the volatile extraction unit 104 may further comprise thermal oxidizers, lower flammability limit (LFL) controls, and/or limited oxygen concentration (LOC) controls. In practice, the formed ceramic green body is transferred into the volatile extraction unit 104, where it is heated to a temperature sufficient to volatilize at least some of the organic materials in the ceramic green body in a low oxygen process atmosphere.

In embodiments, at least 50% of the volatiles are extracted from the ceramic green body during processing in the volatile extraction unit 104. In some embodiments, at least 75% of the volatiles are extracted from the ceramic green body. In other words, in various embodiments, the ceramic green body is heated in the volatile extraction unit 104 for a time sufficient to volatilize at least 75% of volatiles in the organic materials.

After at least some of the organic materials are volatilized and removed from the ceramic green body, the ceramic green body is transferred to the kiln 106, where it is fired at a selected temperature under suitable atmosphere and for a time dependent upon the composition, size, and geometry of the ceramic green body to result in a fired, porous ceramic article 107. The kiln may be, by way of example and not limitation, a tunnel kiln, a fuel or direct fired kiln, an electric kiln, or a microwave-assisted kiln.

As shown in FIG. 1, in various embodiments, the kiln 106 is a different kiln from the volatile extraction unit 104 and the ceramic green bodies are preferably transferred from volatile extraction unit 104 to kiln 106 after the ceramic green bodies are processed in the volatile extraction unit. In other embodiments, kiln 106 and volatile extraction unit 104 are the same kiln, which both extracts volatiles from the ceramic green bodies and then fires the ceramic green bodies.

Firing times and temperatures depend on factors such as the composition and amount of material in the ceramic green body and the type of equipment used to fire the ceramic green body. For example and without limitation, firing temperatures for forming cordierite may range from about 1300° C. up to about 1450° C., with holding times at the peak temperatures ranging from about 1 hour to about 8 hours and total firing times that may range from about 20 hours up to about 85 hours. During firing, temperatures in the firing process atmosphere may be increased at a rate greater than 50° C./hr. Suitable firing processes may include those described in U.S. Pat. Nos. 6,287,509, 6,099,793, or U.S. Pat. No. 6,537,481, each of which is incorporated by reference in its entirety. During firing, remaining organic materials (preferably all remaining organic materials) in the ceramic green body may be removed from the ceramic green body. When fired to form a ceramic article, the honeycomb structures can be used as flow-through substrates such as for catalytic converters or particulate filters for internal combustion systems, such as wall flow filters (that may be comprised of plugged honeycomb bodies) for example.

In various embodiments, because at least some of the organic materials have been removed from the ceramic green body prior to firing, the kiln 106 may be a kiln that is devoid of atmospheric controls (including, but not limited to, active oxygen controls, particulate organic carbon (POC) or process $N_2$), thermal oxidizers, lower flammability limit (LFL) controls, and/or limited oxygen concentration (LOC) controls. Moreover, in various embodiments, the kiln 106 may employ lower levels of volume exchanges of gases within the kiln as compared to kilns employed in conventional firing processes. In some embodiments, because it lacks atmospheric controls, the kiln 106 has a process atmosphere that is permitted to freely fluctuate.

Figure 2:
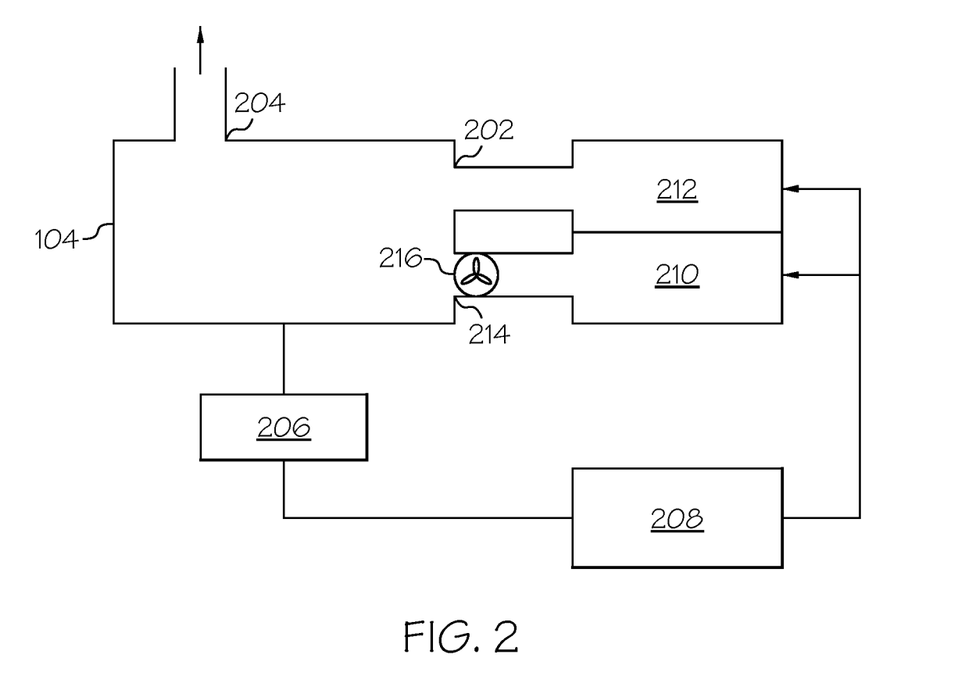
FIG. 2 schematically depicts an example volatile extraction unit for extracting organic materials from a ceramic green body in accordance with one or more embodiments described herein.

FIG. 2 schematically depicts a volatile extraction unit 104 for use with the methods described herein in greater detail. As shown in FIG. 2, the volatile extraction unit 104 comprises a gas injection port 202 for injecting a low oxygen content gas into the volatile extraction unit 104 and an exhaust port 204 through which volatiles may be exhausted from the volatile extraction unit 104. The volatile extraction unit 104 further comprises a lower flammability limit (LFL) detector 206, such as Model 670 Series LFL Detector available from Control Instruments Corporation (Fairfield, N.J.), for continuously measuring and monitoring the LFL level in the volatile extraction unit 104. As used herein, the "lower flammability limit," or LFL, refers to the minimum concentration of volatile combustibles in which a flame can be propagated. LFL is expressed as a percentage. In particular, a LFL level of about 70% means that the atmosphere contains a combustible volatile compound or mixture of combustible volatile compounds in a concentration equal to 70% of the LFL of the mixture. At 100% LFL, the atmosphere can sustain and propagate a flame. Although the volatile extraction unit 104 in FIG. 2 comprises a LFL detector 206, in other embodiments, a flame ionization detector, mass spectrometer, or other measurement device configured to measure the volatiles in the process atmosphere may be employed.

As will be described in greater detail, the LFL detector 206 may provide information regarding the LFL level for use in determining a period of time at which the ceramic green body will be held at a hold temperature to volatilize at least some of the organic material. However, in some embodiments, the hold time may be determined according to a rate of weight loss. In such embodiments, the volatile extraction unit 104 may comprise a scale or other sensor configured to measure the weight of the ceramic green body during the volatile extraction cycle in addition to or as an alternative to the LFL detector 206. As will be described below, the scale may be used to measure a weight of the ceramic green body during the volatile extraction cycle, which may be used to determine a weight loss or rate of weight loss during the volatile extraction cycle. In embodiments including a scale, the weight loss or rate of weight loss may be utilized to determine an amount of organic material extracted from the ceramic green body.

In various embodiments, in addition to the LFL detector 206, the volatile extraction unit 104 may further comprise thermal oxidizers and/or LFL or limiting (minimum) oxygen concentration (LOC) controls (not shown). As used herein, the "limiting oxygen concentration," or LOC, is the minimum $O_2$ concentration in a mixture, such as an atmosphere, that will propagate flame.

For example, in some embodiments, a thermal oxidizer, including, but not limited to, a recuperative thermal oxidizer, a regenerative thermal oxidizer, a regenerative catalytic thermal oxidizer, or a catalytic thermal oxidizer, may be coupled with the exhaust port 204 to reduce the volatile levels or even destroy volatiles in an air stream passing through the exhaust port 204. The thermal oxidizer may comprise one or more external heating sources, such as a burner, to raise the temperature of the air stream entering the thermal oxidizer. In other embodiments, the thermal oxidizer may utilize waste heat generated by the ceramic article production line 100 to elevate the temperature of the air stream passing through the exhaust port 204. For example, heat generated by the kiln 106 may be utilized by the thermal oxidizer in some embodiments. In embodiments in which a thermal oxidizer is employed, the treated air stream exiting the thermal oxidizer has reduced volatile levels as it exits to the atmosphere as compared to the air stream entering the thermal oxidizer.

In FIG. 2, the LFL detector 206 is coupled to a controller 208. The controller 208 is communicatively coupled to a heat source 210 and a gas source 212. In one embodiment, the controller 208 may be a programmable logic controller (PLC), although the controller 208 may be any suitable computing device. Moreover, although FIG. 2 depicts a single controller 208 that is coupled to the LFL detector 206, the heat source 210, and the gas source 212, it is contemplated that other embodiments may employ more than one controller, each configured to perform a portion of the functions of the controller 208. For example, in some embodiments, a temperature control unit may be communicatively coupled to the heat source 210 to adjust the temperature within the volatile extraction unit 104, while a separate process atmosphere control unit may be communicatively coupled to the gas source 212 to adjust the concentration of various components within the process atmosphere.

The controller 208 may comprise one or more processors capable of executing machine readable instructions stored in a memory component, such as an integrated circuit, a microchip, a computer, or any other computing device. The memory component may be configured as a volatile and/or nonvolatile non-transitory computer readable medium and, as such, may comprise random access memory (including SRAM, DRAM, and/or other types of random access memory), flash memory, registers, compact discs (CD), digital versatile discs (DVD), magnetic disks, and/or other types of storage components. Additionally, the memory component may be configured to store, among other things, operation logic. The memory component may also store data, such as data captured by the LFL detector 206 or externally acquired data, for determining whether a suitable amount of organic material has been volatilized and extracted from the ceramic green body or for adjusting the $O_2$ concentration or the temperature within the volatile extraction unit 104.

In embodiments, the controller 208 further preferably comprises a communication pathway that may provide signal interconnectivity between various components coupled to the controller 208, including but not limited to, the LFL detector 206, the heat source 210, and the gas source 212. The communication pathway may be formed from any medium that is capable of transmitting a signal such as, for example, conductive wires, conductive traces, optical waveguides, or the like. The controller 208 may also comprise one or more network interface modules, to connect the volatile extraction unit 104 to a remote computing device or a remote computer network. The network interface module may comprise any wired or wireless networking hardware, such as a modem, LAN port, wireless fidelity (Wi-Fi) card, WiMax card, mobile communications hardware, and/or other hardware for communicating with other networks and/or devices, such as other components within the ceramic article production line 100. Thus, in some embodiments, the communication pathway may facilitate the transmission of wireless signals, such as WiFi, Bluetooth, and the like.

In some embodiments, the LFL detector 206 and the controller 208 operate to provide LFL controls for the volatile extraction unit 104. For example, a maximum LFL setpoint may be established and stored within the memory of the controller 208. The maximum LFL setpoint may be, in some embodiments, about 50% or between about 30% and about 40%, and may vary on the particular temperature within the volatile extraction unit 104 at a given time. When the LFL level measured by the LFL detector 206 exceeds (i.e., is greater than) the maximum LFL setpoint, the controller 208 may cause the $O_2$ concentration within the process atmosphere in the volatile extraction unit 104 to be decreased, the heating rate to be decreased, or both. The heating rate may be decreased, by way of example and not limitation, by slowing the heating rate, by reducing a hold time or temperature, by holding the temperature for a particular period of time, or even creating a cooling period (e.g., a negative heating rate). Accordingly, the controller 208 may be configured to adjust one or more conditions within the volatile extraction unit 104 in response to the comparison between the measured LFL level and the maximum LFL setpoint.

The heat source 210 may be configured to provide convective, conductive, or radiant heat, including but not limited to electric resistance, microwave, gas heating, or a combination thereof. The heat source 210 provides combustion air to the volatile extraction unit 104 via a heat inlet 214. In some embodiments, a blower 216 is positioned near the heat inlet 214 to circulate the heat within the volatile extraction unit 104. Additionally, in various embodiments, a temperature sensor (not shown) may be integrated with the heat source 210, although it is contemplated that the temperature sensor may be a standalone sensor. In various embodiments, the temperature sensor is configured to sense the temperature within the volatile extraction unit 104 and provide feedback to the controller 208.

The gas source 212 may comprise recirculated products of combustion (e.g., water vapor, nitrogen ($N_2$) gas and carbon dioxide ($CO_2$) gas), nitrogen ($N_2$) gas and air, any inert or noble gas such as helium, neon, and argon, or any gas containing a low level of oxygen ($O_2$) such as $N_2$ gas or $CO_2$ gas. Although a single gas source 212 is depicted in FIG. 2, it is contemplated that multiple gas sources may be employed to provide the volatile extraction unit 104 with a low-oxygen process atmosphere and to enable the oxygen concentration within the process atmosphere to be increased after the ceramic green body is cooled, as will be described in greater detail below.

In some embodiments, the volatile extraction unit 104 may comprise a scale configured to measure the weight of the ceramic green body during the volatile extraction cycle. The scale may be communicatively coupled to the controller 208 such that the controller 208 may receive and store the weight of the ceramic green body over time. In embodiments in which the volatile extraction unit 104 includes a scale, the time for the volatile extraction cycle may be based at least in part on an amount of weight loss of the ceramic green body or on a rate of weight loss of the ceramic body, as will be described below.

In operation, one or more ceramic green bodies are positioned within the volatile extraction unit 104. The controller 208 adjusts the process atmosphere by causing the gas source 212 to provide gas such that the process atmosphere is from about 2% to about 7% oxygen ($O_2$) by volume. In some embodiments, gas source 212 provides sufficient gas such that the process atmosphere is from about 2% to about 7% or from about 4% to about 6% $O_2$ by volume of the process atmosphere. For example, the gas source 212 may inject a low oxygen gas, such as a nitrogen or $CO_2$ enriched gas into the volatile extraction unit 104 through the gas injection port 202.

In various embodiments, the controller 208 additionally causes the heat source 210 to begin heating the process atmosphere. In various embodiments, the controller 208 causes the heat source 210 to increase the temperature of the process atmosphere within the volatile extraction unit 104 from room temperature to a temperature (e.g., a maximum debind temperature) of from about 225° C. to about 400° C., from about 250° C. to about 350° C., or from about 225° C. to about 300° C. In embodiments, the temperature to which the process atmosphere is heated may be referred to as a hold temperature, such as when the temperature within the volatile extraction unit will be held at the target temperature for a period of time.

As will be described in greater detail below, the controller 208 may cause the heat source 210 to hold the temperature within the volatile extraction unit 104 for a period of time sufficient to allow the concentration of volatiles or the rate of weight loss to reach their peak and, in some embodiments, for a period of time sufficient for the peak volatile concentration or rate of weight loss to have reduced by at least about 10%, at least about 25%, at least about 30%, or even at least about 50%. The hold time may be about 1 hour, about 2 hours, about 3 hours, about 4 hours, or even about 5 hours. In embodiments in which a hold is utilized, the hold time may be from about 0 hours to about 4 hours, from about 2 hours to about 3.5 hours, or the like. However, in some embodiments, the concentration of volatiles or the rate of weight loss may reach their peak or be reduced by at least about 10%, at least about 25%, at least about 30%, or even at least about 50% of the peak value during the ramp up to a predetermined temperature. In such embodiments, a hold may not be utilized.

The heating rate may be greater than or equal to about 50° C. per hour (° C./hr.). For example, in some embodiments, the heating rate may be from about 50° C./hr. to about 200° C./hr., from about 60° C./hr. to about 130° C./hr., or from about 75° C./hr. to about 125° C./hr. In various embodiments, the heating rate may be less than or equal to about 200° C./hr., less than or equal to about 130° C./hr., less than or equal to about 125° C./hr., or even less than or equal to about 80° C./hr. In some embodiments, the heating rate may be about 75° C./hr., about 100° C./hr., or even about 125° C./hr. The heating rate may be limited to 200° C./hr. or less in some embodiments. In embodiments, the particular heating rate employed may depend at least in part on the size of the ceramic green body, the constituents within the ceramic batch mixture used to form the ceramic green body, and the shape of the ceramic green body.

While the ceramic green body is heated in the volatile extraction unit 104 through exposure to the process atmosphere within that unit, the LFL detector 206 measures the LFL level, or combustible concentration, of the process atmosphere in the volatile extraction unit 104. In embodiments, the LFL level is continuously measured. The LFL detector 206 provides the measured LFL level to the controller 208, which stores the LFL levels in a database. In various embodiments, the LFL levels over time may be displayed on a display device (not shown) coupled to the controller 208.

Figure 3:
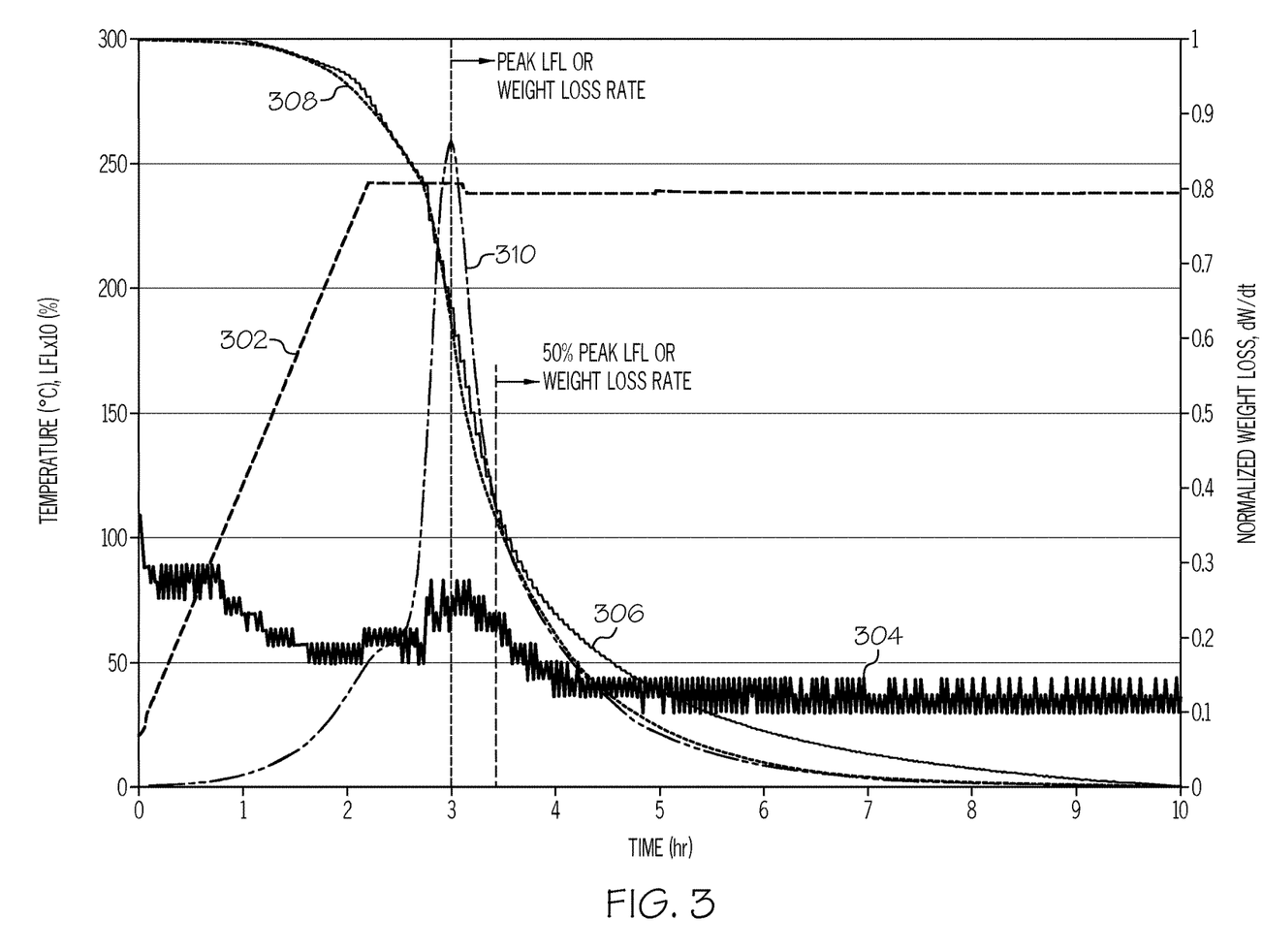
FIG. 3 graphically depicts temperature (left-hand vertical axis), lower flammability limit levels (left-hand vertical axis), modeled weight loss for a ceramic green body, measured weight loss for a ceramic green body, and weight loss rate (right-hand vertical axis) as a function of time (horizontal axis) in accordance with one or more embodiments described herein.

As provided hereinabove, the minimum hold time for a volatile extraction cycle may be determined by the LFL or by weight loss. As used herein, the "hold time" refers to the period of time during which the temperature within the volatile extraction unit is maintained at a target temperature. FIG. 3 depicts the temperature 302, the LFL curve 304, the measured weight loss 306, the modeled weight loss 308, and the weight loss rate (dW/dt) 310 for an example volatile extraction cycle over time, as indicated in hours (hr) on the horizontal axis of the graph. The left-hand vertical axis of FIG. 3 provides a temperature, indicated in ° C., and LFL scale, indicated in % times 10, for the LFL levels within the process atmosphere. The right-hand vertical axis of FIG. 3 provides a normalized weight loss scale, represented as a rate of weight loss, dW/dt.

As shown in FIG. 3, the temperature 302 of the process atmosphere is ramped up from about room temperature to a hold temperature of about 240° C. over a period of about two hours and held at about 240° C. for about 8 hours. During that time, the LFL curve 304 (values shown in FIG. 3 as percentages (%) scaled up by a factor of 10), begins at about 8%, then drops to about 5% before peaking at about 8% at an elapsed time of 3 hours. The measured weight loss 306 exhibits a sharp drop between the elapsed time of 2 and 4 hours. A modeled weight loss 308 was fit to the measured weight loss 306 and used to determine a weight loss rate 310. The peak in the weight loss rate 310 at the elapsed time of 3 hours corresponds to the sharp drop in the measured weight loss 306 between 2 and 4 hours. In various embodiments, the minimum hold time may be selected as the time at which the LFL curve 304 and/or the weight loss rate 310 peak. In other embodiments, the minimum hold time may be selected as the time at which the LFL curve 304 and/or the weight loss rate 310 reach an amount equal to 50% of the peak level.

Volatilized organic materials, sometimes referred to as volatile organic components or simply "volatiles," extracted from the ceramic green body may be exhausted through the exhaust port 204. In various embodiments, the volatilized organic materials may be processed before being exhausted to the atmosphere. For example, the volatilized organic materials may be treated using thermal oxidizers, LFL controls, LOC controls, or the like to meet environmental regulations. In some embodiments, at least a portion of the volatilized organic materials may be recycled or reclaimed. For example, extrusion oils that are volatilized may be reclaimed.

After at least a portion of organic material has been extracted from the ceramic green body, in various embodiments, the ceramic green body is cooled to a temperature below about 200° C. For example, the temperature of the process atmosphere may be decreased from the hold temperature after the peak LFL has been reached or after the peak LFL has been reached and the LFL has decreased to 50% or less of the peak LFL. As another example, the temperature of the process atmosphere may be decreased from the hold temperature after a target weight loss has been reached, after the peak weight loss rate has been reached, or after the peak weight loss rate has been reached and the weight loss rate has decreased to 50% or less of the peak weight loss rate.

In some embodiments, the ceramic green body is cooled to a temperature below about 190° C., below about 180° C., below about 170° C., below about 160° C., or even below about 150° C. For example, the ceramic green body may be cooled to a temperature between room temperature and about 200° C., between room temperature and about 175° C., or between room temperature and about 150° C. In various embodiments, the ceramic green body is cooled by cooling the process atmosphere to which the ceramic green body is exposed.

Once the ceramic green body is cooled, oxygen may be reintroduced to the process atmosphere. For example, once the ceramic green body reaches a temperature below about 200° C., the amount of $O_2$ in the process atmosphere may be increased to a concentration substantially equivalent to ambient concentration. For example, the amount of $O_2$ may be increased to a concentration of greater than 15% by volume or about 20.9% by volume of the process atmosphere. Oxygen levels may be increased by adding oxygen to the process atmosphere using a gas source, or the process atmosphere may be slowly opened to the environmental atmosphere, such as through an inlet valve. Without being bound by theory, cooling the ceramic green body to a temperature below about 200° C. before increasing the concentration of $O_2$ in the process atmosphere may prevent combustion of the ceramic green body in the volatile extraction unit. In some embodiments, the ceramic green body may be maintained in an atmosphere containing greater than 15% $O_2$ by volume for further cooling.

After the amount of $O_2$ in the process atmosphere is returned to a level comparable to atmospheric concentrations of $O_2$, in various embodiments, the ceramic green body may be transferred into the kiln 106 for firing.

As another example, the ceramic green body is positioned within the volatile extraction unit 104. The controller 208 causes the gas source 212 to provide gas sufficient to adjust the process atmosphere such that the process atmosphere is from about 2% to about 7% oxygen ($O_2$) by volume. For example, the gas source 212 may inject a low oxygen gas, such as a nitrogen or $CO_2$ enriched gas into the volatile extraction unit 104 through the gas injection port 202.

The controller 208 additionally causes the heat source 210 to begin heating the ceramic green body to increase the temperature within the process atmosphere from room temperature to a first hold temperature of from about 140° C. to about 180° C., where the ceramic green body is held for a first period of time, and then increase the temperature of the process atmosphere to a second hold temperature of from about 225° C. to about 400° C. In embodiments, the first hold temperature and the second hold temperature (e.g., the maximum debind temperature) can extend over a debind temperature range (e.g., from 100 C to 400 C) for the process atmosphere. Without being bound by theory, it is believed that exposing the ceramic green body to a process atmosphere heated to the first temperature may be sufficient to volatilize extrusion oils such as mineral oil, and heating the process atmosphere to the second temperature may be sufficient to volatilize binders and starches. As will be described in greater detail herein, the controller 208 may cause the heat source 210 to hold the temperature within the volatile extraction unit 104 for a period of time sufficient to allow the concentration of volatiles or the rate of weight loss to reach their peak and, in some embodiments, for a period of time sufficient for the peak volatile concentration or rate of weight loss to have reduced by at least about 10%, at least about 25%, at least about 30%, or even at least about 50%.

The heating rate may be greater than or equal to about 50° C. per hour (° C./hr.). For example, the heating rate may be from about 50° C./hr. to about 200° C./hr., from about 60° C./hr. to about 130° C./hr., or from about 75° C./hr. to about 125° C./hr.

While the ceramic green body is heated in the volatile extraction unit 104, the LFL detector 206 measures the LFL level, or combustible concentration, of the process atmosphere in the volatile extraction unit 104. Volatilized organic materials are exhausted through the exhaust port 204. The volatilized organic materials may be treated using thermal oxidizers, LFL controls, LOC controls, or the like to meet environmental regulations.

After a suitable portion of organic materials has been extracted from the ceramic green body, the ceramic green body is cooled to a temperature between room temperature and about 200° C., between room temperature and about 175° C., or between room temperature and about 150° C.

Once the ceramic green body is cooled, oxygen is reintroduced to the process atmosphere such that the amount of $O_2$ in the process atmosphere reaches a concentration of about 20.9% by volume of the process atmosphere. After the amount of $O_2$ in the process atmosphere is returned to a level comparable to atmospheric concentrations of $O_2$, in various embodiments, the ceramic green body may be transferred into the kiln 106 for firing.

In embodiments in which at least a portion of the organic materials are volatilized from the ceramic green body prior to firing, the firing cycles may be shortened compared to conventional firing cycles. For example, in some embodiments, the firing cycles may be reduced by an amount of time equal to a length of time of the volatile extraction cycle. Accordingly, although the total amount of time may be equivalent, embodiments in which the volatile extraction step is included may result in less time in the kiln, which in turn may increase the availability of the kiln. Moreover, in some embodiments, one volatile extraction unit 104 may feed multiple kilns in a ceramic article production line.

EXAMPLE

The various embodiments described hereinabove will be further clarified by the following example.

Figure 4:
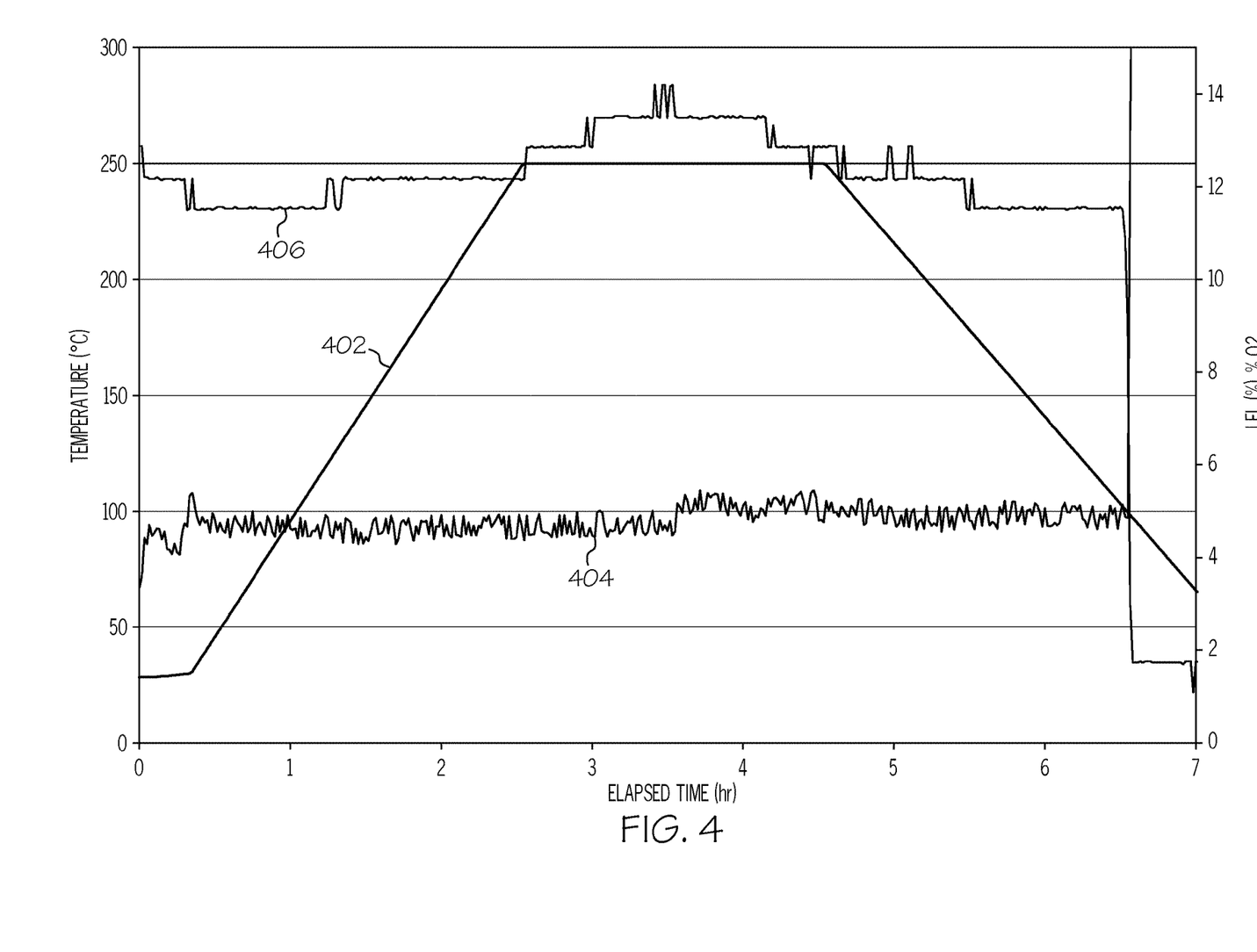
FIG. 4 graphically depicts temperature (in ° C.; left-hand vertical axis), LFL level (in %; right-hand vertical axis), and oxygen concentration (in %; right hand vertical axis) are shown as a function of time (in hours; horizontal axis) for an example volatile extraction cycle in accordance with one or more embodiments described herein.

Ten ceramic green bodies for forming light duty ceramic cordierite filters were subjected to a volatile extraction cycle. The process conditions for the volatile extraction cycle are presented in Table 1. The temperature (in ° C.), LFL level (in %), and oxygen concentration (in %) are shown as a function of time (in hours) for the volatile extraction cycle are depicted in FIG. 4. Specifically, the left-hand vertical axis provides a temperature, in ° C., while the right-hand vertical axis provides a LFL and oxygen ($O_2$) concentration by volume, both in percentages (%). Elapsed time, in hours (hr.) is provided along the horizontal axis. As shown by plot 402, the average temperature in the volatile extraction unit was increased from about room temperature (i.e., about 23° C.) to a temperature of 250° C. The temperature was held at 250° C. for two (2) hours before it is decreased. As shown by plot 404, the process atmosphere had an oxygen concentration of about 4% during the volatile extraction cycle. Plot 406 represents the LFL level measured within the volatile extraction unit. As shown in FIG. 4, the LFL curve peaked at about 14% just before an elapsed time of four (4) hours, and then decreased. Notably, the LFL curve represented by plot 406 came down to a baseline level of about 12% near the end of the temperature hold, indicating that the volatile release was near completion.

Following the volatile extraction cycle, the ten ceramic green bodies were transferred to a kiln and subjected to a firing cycle. Ten additional ceramic green bodies which were not subjected to a volatile extraction cycle were subjected to a separate firing cycle as a control. The process conditions and results for the volatile extraction and firing cycles are provided in Table 1 below.

TABLE 1

Process Conditions and Results

|  | Volatile Extraction and Firing | Firing only (Control) |
| --- | --- | --- |
| Part size | 4.66 × 6" | 4.66 × 6" |
| Sample size | 10 | 10 |

TABLE 1-continued

Process Conditions and Results

|  | Volatile Extraction and Firing | Firing only (Control) |
| --- | --- | --- |
| Volatile Extraction Cycle Conditions | | |
| Hold Temperature | 250° C. | n/a |
| Hold Oxygen Level | 4% | n/a |
| Hold Time | 2 hr. | n/a |
| Firing Cycle Conditions | | |
| Firing Heating Rate (room temperature to 900° C.) | 125° C./hr. | 125° C./hr. |
| Firing $O_2$ set point | 18% | 18% |
| Crack Rate | 0/10 | 0/10 |
| LFL (%) | 3.80% | 9.60% |

Figure 5:
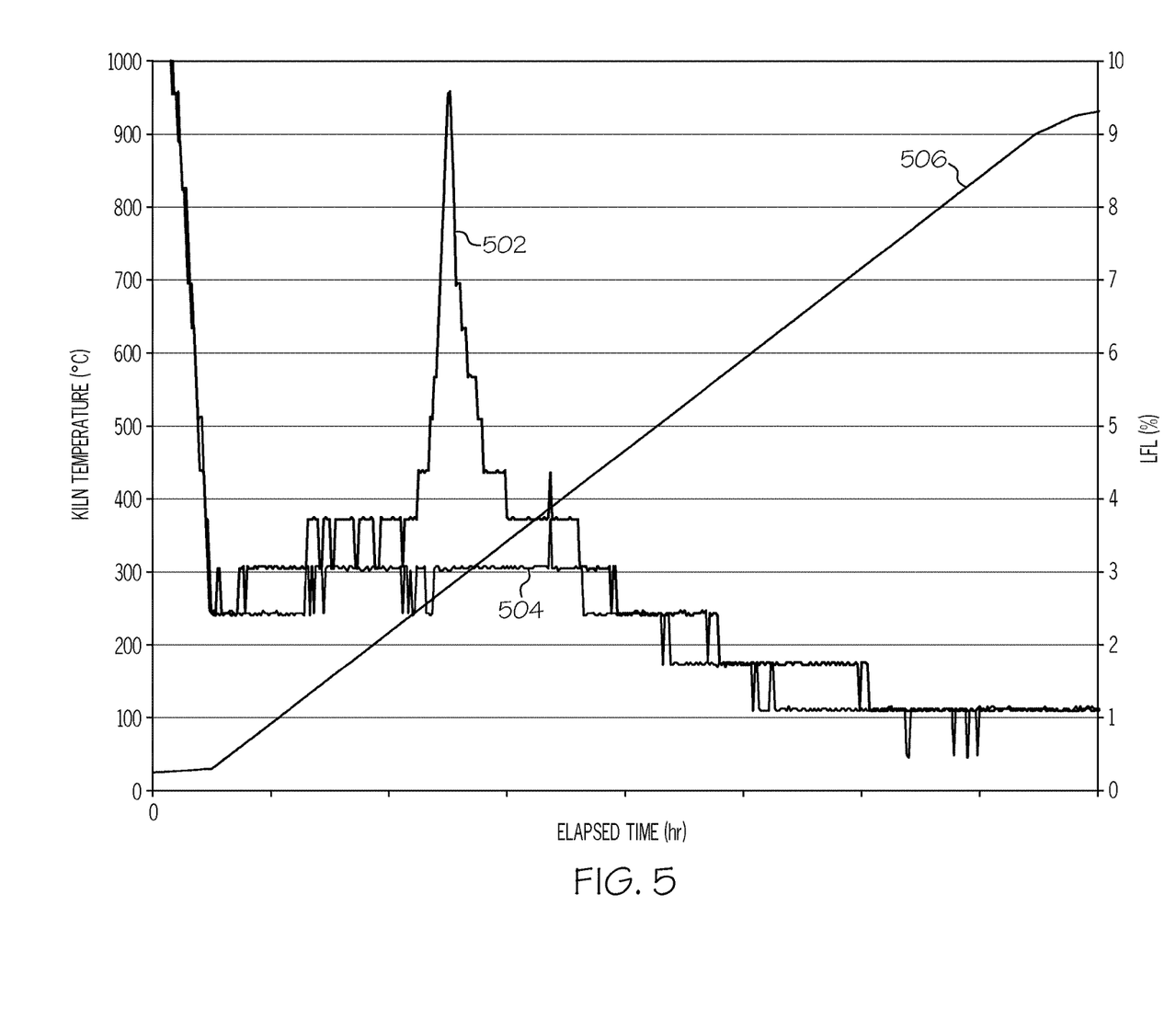
FIG. 5 graphically depicts LFL levels (in %; right-hand vertical axis) and average temperature (in ° C.; left-hand vertical axis) of a firing cycle for ceramic green bodies subjected to a volatile extraction cycle as a function of time (in hours; horizontal axis) in accordance with one or more embodiments described herein and for ceramic green bodies not subjected to a volatile extraction cycle in accordance with one or more embodiments described herein.

During the firing cycle, the LFL levels were measured. The results are shown in FIG. 5. The left-hand vertical axis of FIG. 5 provides a temperature, in ° C., while the right-hand vertical axis provides a LFL level, in percentages (%). Elapsed time, in hours (hr.) is provided along the horizontal axis. In FIG. 5, the LFL curve 502 for the ceramic green bodies that were not subjected to the volatile extraction cycle (i.e., the control wares) shows a sharp LFL peak at about 3 hours while the temperature (represented by plot 506) is being ramped up. As reported in Table 1, this peak corresponds to a LFL of 9.60%. However, the LFL curve 504 for the ceramic green bodies that were subjected to the volatile extraction cycle (i.e., the exemplary wares) does not show a LFL peak. FIG. 5 demonstrates that the use of the volatile extraction cycle prior to firing is effective to reduce the LFL levels released during firing. In particular, FIG. 5 suggests that because the LFL level remains below about 4.5% and has an average level of about 3.8%, the LFL controls, LOC controls, and other controls conventionally necessitated by environmental regulations related to volatilization of organic materials may be removed from the kiln when the ceramic green bodies are first subjected to a volatile extraction cycle.

Thus, the firing of ceramic green bodies to convert them to ceramic articles can include the debinding or removal from the bodies of various organic binding or pore-forming constituents. Those constituents are employed in the forming stage of manufacture to facilitate shaping of plastic mixtures of ceramic precursor powders and binding constituents into self-supporting ceramic green bodies. The embodiments of the present disclosure can address significant manufacturing difficulties that can arise with known processes and equipment, such as where the ceramic green bodies include more than about 5% by weight of organic constituents such as cellulosic binders and/or pore forming additives, such as starch, that, are combustible. High rates of cracking could result in fired ware if the removal of organic binding and/or pore-forming constituents is not carefully managed. The debinding of large ceramic green bodies, such as those used for the production of cordierite particulate filters for treating heavy duty diesel engine exhaust streams, can be particularly problematic, and can be addressed by one or more embodiments of the present invention. In addition, the organic binding and/or pore-forming constituents may produce volatiles as they are released from the ceramic green body. In contrast, various embodiments described herein may be employed to extract or debind volatiles or organic material from ceramic green bodies prior to firing the ceramic green bodies to produce ceramic articles. Removal of at least some of the organic material from the ceramic green bodies in a volatile extraction unit prior to firing at higher oxygen levels and at faster firing rates may reduce average and peak LFL levels, thereby preferably eliminating the need for kilns to be provided with expensive equipment such as atmospheric controls, thermal oxidizers, LFL controls and/or LOC controls which are conventionally employed to meet environmental regulations. This can, in turn, reduce capital costs associated with kilns. Moreover, because a single volatile extraction unit, which may have a shorter processing cycle as compared to a conventional kiln, may feed multiple kilns in a ceramic article production line, manufacturing throughput of ceramic articles may be increased.

It will be apparent to those skilled in the art that various modifications and variations can be made to the embodiments described herein without departing from the spirit and scope of the claimed subject matter. Thus it is intended that the specification cover the modifications and variations of the various embodiments described herein provided such modification and variations come within the scope of the appended claims and their equivalents.

What is claimed is:

1. A method of producing a ceramic article, the method comprising:
    heating a ceramic green body containing a quantity of one or more organic materials to extract at least a portion of the organic materials from the ceramic green body by exposing the ceramic green body to a process atmosphere which is heated to a hold temperature of from 100° C. to 225° C. and has from 2% to 7% $O_2$ by volume of the process atmosphere; then
    cooling the ceramic green body to a temperature below the hold temperature;
    after the ceramic green body is cooled to a temperature below the hold temperature, exposing the ceramic green body to a higher concentration of $O_2$ than in the process atmosphere of the heating step; and
    firing the ceramic green body to form the ceramic article.

2. The method of claim 1, wherein the heating step is performed inside a kiln.

3. The method of claim 1, wherein the heating step and the cooling step are performed inside a kiln.

4. The method of claim 1, wherein the step of exposing the ceramic green body to the higher concentration of $O_2$ is performed inside a kiln.

5. The method of claim 1, wherein the heating step is performed inside a first kiln and the firing step is performed in a second kiln different from the first kiln.

6. The method of claim 5, wherein a process atmosphere within the kiln in which the firing step is performed is permitted to freely fluctuate.

7. The method of claim 1, wherein the cooling step comprises maintaining the ceramic green body in the process atmosphere containing 2% to 7% $O_2$ by volume.

8. The method of claim 1, wherein at least 50% of the volatiles are extracted from the ceramic green body during the heating step.

9. The method of claim 1, wherein a remainder of the organic materials remains in the ceramic green body after the heating step, and the remainder is removed from the ceramic green body during the firing step.

10. The method of claim 1, wherein the firing step comprises increasing a temperature of a firing process atmosphere at a rate greater than 50° C./hr.

11. The method of claim 1, wherein a rate of temperature increase of the process atmosphere during the heating step is limited to 200° C./hr or less.

12. The method of claim 1, wherein the temperature of the process atmosphere in the heating step is decreased from the hold temperature after a peak lower flammability limit (LFL) has been reached in the process atmosphere.

13. The method of claim 1, wherein the temperature of the process atmosphere in the heating step is decreased from the hold temperature after a peak lower flammability limit (LFL) has been reached in the process atmosphere and the LFL has decreased to 50% or less of the peak LFL.

14. The method of claim 1, wherein the temperature of the process atmosphere in the heating step is decreased from the hold temperature after a target weight loss of the ceramic green body is reached.

15. The method of claim 1, further comprising measuring lower flammability limit (LFL) in the process atmosphere and controlling the duration of exposure of the ceramic green body to the hold temperature based on LFL measurement.

16. The method of claim 1, wherein the ceramic green body is heated for a time sufficient to volatilize at least 75% of volatiles in the organic materials.

17. The method of claim 1, further comprising holding the ceramic green body at the hold temperature for a hold time of ≥0 hours to 4 hours.

18. The method of claim 1, further comprising measuring a lower flammability limit in the process atmosphere, wherein heating the ceramic green body comprises heating the ceramic green body for a time sufficient for the lower flammability limit to reach a peak level.

19. The method of claim 18, wherein heating the ceramic green body comprises heating the ceramic green body for a time sufficient for the lower flammability limit to decrease to an amount of at least 50% of the peak level.

20. The method of claim 1, wherein from 30 wt % to 50 wt % of the organic materials are extracted from the ceramic green body upon completion of the heating.

* * * * *

UNITED STATES PATENT AND TRADEMARK OFFICE
CERTIFICATE OF CORRECTION

Page 1 of 1

PATENT NO. : 12,024,472 B2
APPLICATION NO. : 18/135348
DATED : July 2, 2024
INVENTOR(S) : Douglas Richard Wing It is certified that error appears in the above-identified patent and that said Letters Patent is hereby corrected as shown below:

In the Claims

In Column 18, Lines 4-5, in Claim 8, delete the word "the" between the words "of" and "volatiles".

Signed and Sealed this
Sixth Day of May, 2025

Coke Morgan Stewart
*Acting Director of the United States Patent and Trademark Office*